(12) United States Patent
Zekavica

(10) Patent No.: US 8,573,699 B2
(45) Date of Patent: Nov. 5, 2013

(54) VEHICLE SEAT

(75) Inventor: Ornela Zekavica, Novi, MI (US)

(73) Assignee: Johnson Controls Technology Company, Holland, MI (US)

( * ) Notice: Subject to any disclaimer, the term of this patent is extended or adjusted under 35 U.S.C. 154(b) by 322 days.

(21) Appl. No.: 12/671,571

(22) PCT Filed: Sep. 10, 2008

(86) PCT No.: PCT/US2008/075778
§ 371 (c)(1),
(2), (4) Date: Jun. 29, 2011

(87) PCT Pub. No.: WO2009/036007
PCT Pub. Date: Mar. 19, 2009

(65) Prior Publication Data
US 2011/0260514 A1 Oct. 27, 2011

Related U.S. Application Data

(60) Provisional application No. 60/971,291, filed on Sep. 11, 2007.

(51) Int. Cl.
*B60N 2/22* (2006.01)
*B60N 2/235* (2006.01)

(52) U.S. Cl.
USPC .......... 297/378.13; 297/367 R; 297/370; 297/372; 296/65.16

(58) Field of Classification Search
USPC ...... 297/378.13, 378.12, 378.14, 367 R, 370, 297/372; 296/65.16, 65.17, 65.09
See application file for complete search history.

(56) References Cited

U.S. PATENT DOCUMENTS

| | | | | |
|---|---|---|---|---|
| 4,627,656 A * | 12/1986 | Gokimoto et al. | ......... | 296/65.09 |
| 6,132,000 A * | 10/2000 | Tanaka | ..................... | 297/378.13 |
| 6,345,867 B1 * | 2/2002 | Hellrung et al. | ............... | 297/336 |
| 6,354,663 B1 * | 3/2002 | Zhang et al. | .................. | 297/336 |
| 7,032,973 B2 * | 4/2006 | Reubeuze | ................ | 297/378.13 |
| 7,152,922 B2 * | 12/2006 | Garland | ................. | 297/362.11 |
| 7,377,584 B2 * | 5/2008 | Griswold et al. | ........ | 297/216.12 |
| 7,959,205 B2 * | 6/2011 | Paing et al. | ................ | 296/65.03 |
| 2005/0062327 A1 * | 3/2005 | Griswold et al. | .......... | 297/378.1 |
| 2008/0129017 A1 * | 6/2008 | Okazaki et al. | ............... | 280/727 |

* cited by examiner

*Primary Examiner* — David Dunn
*Assistant Examiner* — Richard Lowry
(74) *Attorney, Agent, or Firm* — Dickinson Wright PLLC

(57) ABSTRACT

A rear seat of a vehicle which allows controlled reclining of the seat as well as folding the seatback to a stowed position.

7 Claims, 7 Drawing Sheets

VEHICLE SEAT

CROSS REFERENCE TO RELATED APPLICATION

This application claims priority to U.S. Provisional Application Ser. No. 60/971,291 filed Sep. 11, 2007, entitled "Vehicle Seat" and also claims priority to PCT International Application No. PCT/US2008/075778 filed Sep. 10, 2008, entitled "Vehicle Seat," the entire disclosure of the applications being considered part of this application and hereby incorporated by reference.

BACKGROUND OF THE INVENTION

1. Technical Field

The present invention is directed to a vehicle seat, typically a rear seat of a vehicle, having a limited recline adjustment range as well as the ability to fold the seatback to allow for a flat cargo area or to increase the cargo area of a vehicle.

2. Discussion

While a variety of adjustments have been long available for the front seats of a vehicle, such as recline or the ability to angle the seatback to increase occupant comfort, rear seats of vehicles traditionally have been fixed in place and prevented from moving. As vehicles decreased in size, users needed vehicles to be easily configurable to transport items that did not fit in the normal cargo space. To respond to this need, the seatback of some vehicle rear seats were configured to fold forward to allow a user to transport objects that would not fit within the trunk or cargo area of the vehicle. While especially applicable to smaller vehicles, this trend continued to larger vehicles, such as SUVs and minivans for all seats rearward of the front vehicle seats. To allow for even more load configurations, some vehicle rear seats were configured to allow the seatback to fold rearward, and many seats allowed multiple fold options such that the seats could be quickly stowed to create a flat cargo space.

Even though the seats and in particular the seatback of the rear seat could fold in a variety of ways, when the seat is in an upright position and capable of receiving a passenger, it is still set at a standard position. The standard position, based upon the design of the vehicle and configuration of the seats was typically set at what the manufacturer believed was the most comfortable angle for an average user. The problem with setting the angle of the seatback to the average user is that the angle considered comfortable by users varies significantly, especially with both children and adults using the rear seat of a vehicle. Even passengers of similar sizes may differ about what is the most comfortable seating angle. Therefore, there is a desire to have a rear vehicle seat that folds to allow increased cargo space to transport objects that would not normally fit within the cargo area of the vehicle, as well as provides the ability to adjust the angle of the seatback when the seat is capable of receiving a passenger.

SUMMARY OF THE INVENTION

In view of the above, the present invention is directed to a vehicle seat and, more specifically, to a rear vehicle seat which allows both folding of the seat to allow for various load options as well as limited adjustment of the angle of the upper seatback to increase a passenger's comfort while the passenger is seated within the seat.

The rear vehicle seat includes a typical lower seat cushion and seatback forming the seating surface. The seatback pivots about at least one pivot axis and a latch mechanism attached to the seatback allows for the locking of the seatback in an upright position or for the release of the seatback to move between an upright position and a stowed position, such as a fold forward position, or a fold rearward position. The latch mechanism typically includes a latch attached to a release mechanism, such as a cable that extends to a handle or other control device on the side of the seat.

In addition to the latch mechanism, the seat includes a recline mechanism that allows the seatback of the rear seat to move about a pivot axis in a limited range of motion. The recline mechanism may be at least partially formed as part of the latch mechanism. The pivot axis for the fold or stow option may be different than the pivot axis for the recline mechanism. The latch mechanism stays latched to an anchor device attached or coupled to the vehicle body either directly or indirectly. When the latch mechanism is coupled to the anchor device, the seatback stays in a substantially upright position while allowing the seatback to move in a limited range of motion with the recline mechanism. More specifically, the recline mechanism allows the upper seatback to pivot or angle relative to the lower seat cushion. This angular pivoting movement provided by the recline mechanism allows a passenger in the rear vehicle seat to recline the seatback for a more reclined position or to move the seat to a more upright position with potential for various positions therebetween. The recline mechanism allows for only a limited range of movement to ensure that the vehicle seatback does not fold completely rearward or forward while the passenger is sitting on the seat.

The recline mechanism is typically a first toothed or geared device commonly called a sector that engages with a second toothed or geared device, commonly called a rack.

To recline the seat, the passenger disengages the sector from the rack, or the rack from the sector, and moves the seat to a desired position and then re-engages the sector and the rack to lock the seatback into the desired position. Of course, other engagement mechanisms such as a frictional engagement system may be substituted for the sector and rack or even the first and second mechanisms.

The seatback may also include a spring or biasing assembly to assist the movement of the seatback to a more upright position when the first and second recline mechanisms are disengaged. The biasing mechanism is helpful in moving the seatback by providing a force to move the seat to an upward position while a passenger is sitting within the seat. The biasing mechanism may be similar to biasing mechanisms used on front driver and passenger vehicle seats. An additional biasing assembly may be used to ensure that the first and second recline engagement mechanisms stay engaged.

The anchor member is attached to the body, known in the industry as the body-in-white and the latch mechanism is attached to the seat frame. The anchor member and latch mechanism cooperate to form what is known as high latch in the industry instead of low latch. Low latch is approximately located about the pivot axis of the seat frame. High latch is located remote from the pivot axis, typically somewhere between the top of the seat frame and the pivot axis. As the latch mechanism approaches the pivot axis, more recline movement is available, without extending the length of the recline mechanism, however more force is also applied to the recline mechanism. Therefore, the present invention places the latch mechanism at a distance from the pivot axis that provides a balance between the amount of recline and the force or load applied to the latch and recline mechanisms.

Further scope of applicability of the present invention will become apparent from the following detailed description and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below and the accompanying drawings in which.

DETAILED DESCRIPTION OF THE PREFERRED EMBODIMENT

Before beginning the detailed description of an exemplary embodiment, several general comments are warranted about the applicability and scope of the present invention. First, the illustrations relate to a seat particularly adapted to a car, but the invention is applicable also to vehicles such as vans, trucks, sport utility vehicles, crossovers, buses, and the like. The present invention is also applicable to some seats used in other vehicles such as aircraft, railroad vehicles, and nautical vehicles. Second, the seat of the present invention is illustrated schematically in most of the figures, however some of the figures illustrate the seat as being a padded seat having certain contours, trim, and the like or certain shapes or configurations to various components of the seat. The invention is not limited to the illustrated embodiments and a wide variety of seat configurations and appearances will benefit from the use of the latching, recline, and movement mechanisms described in connection with the figures.

Substantial modifications may be made without departing from the intended scope of the invention. For example, while certain mechanical systems are described to move seat components to achieve certain results, other mechanisms such as powered mechanisms could be substituted therefore.

Figure 1:
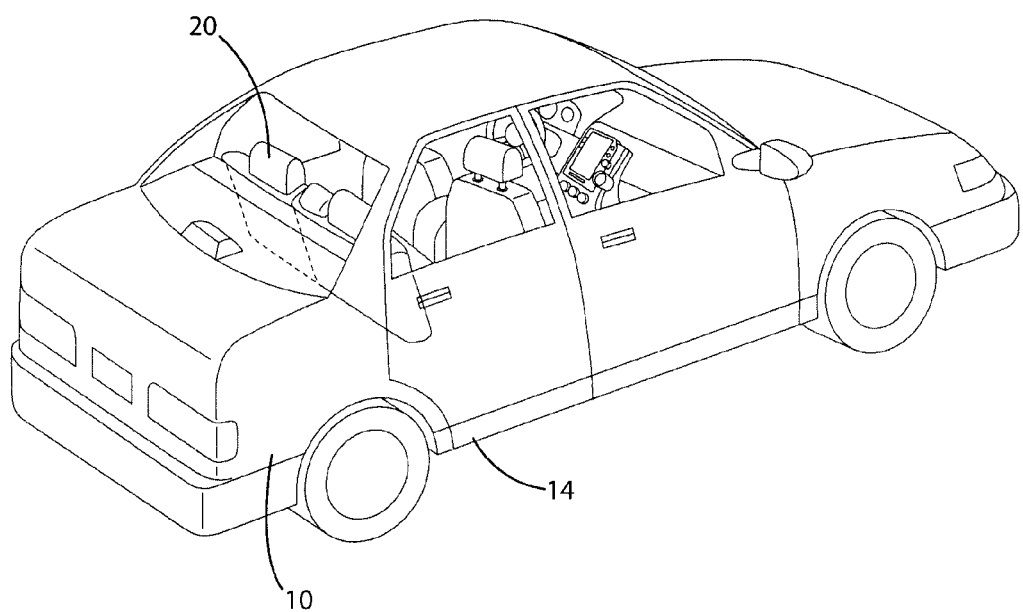
FIG. 1 is a perspective view of a vehicle having an exemplary rear seat.
Figure 2:
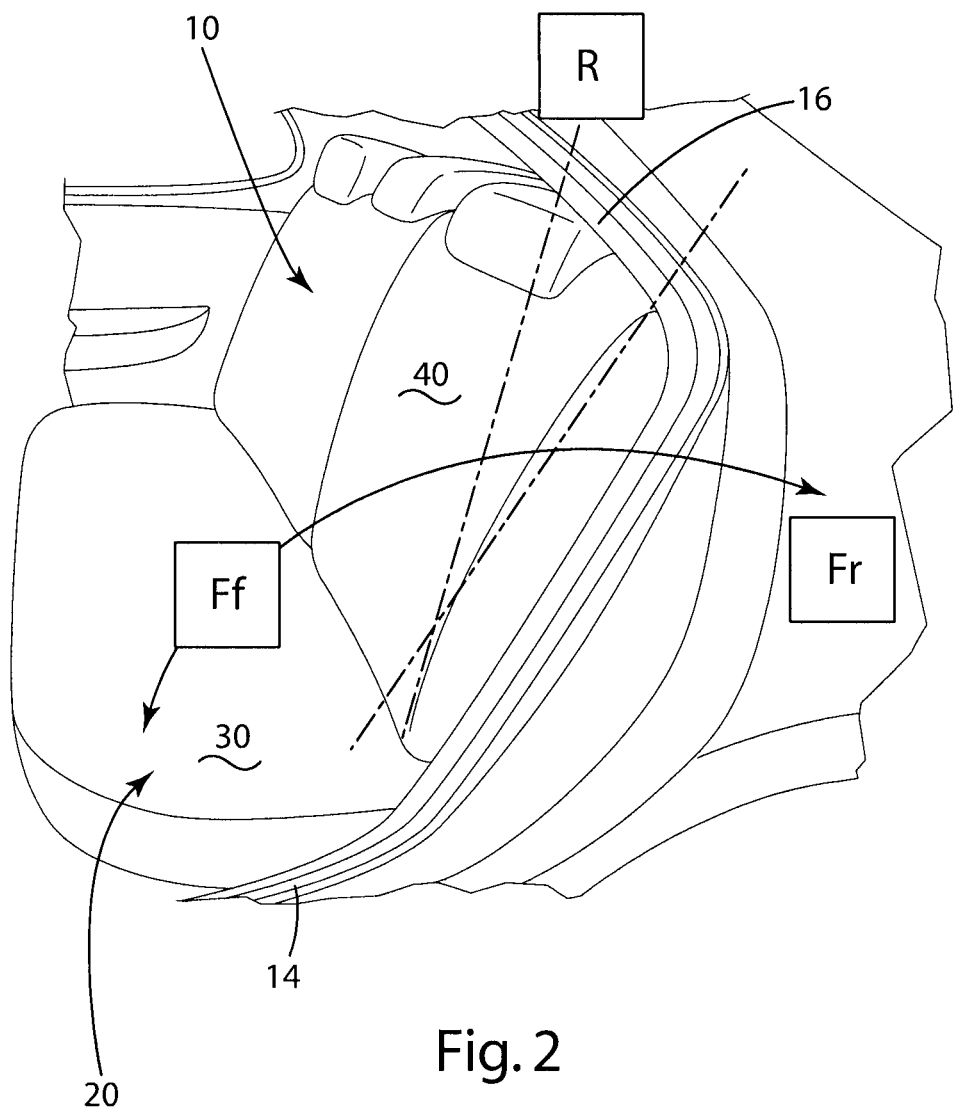
FIG. 2 is a perspective view of an exemplary rear vehicle seat.

Referring generally to the figures, and in particular to FIGS. 1 and 2, there is shown a vehicle body 10 into which a rear seat 20 is assembled. The vehicle body 10 includes a base 14 and a door frame 16, illustrated in the figures as an exemplary embodiment. The shape and configuration of these elements may change depending on the type of vehicle, size of vehicle, model of vehicle, and other configurations.

The present invention is generally directed to a rear seat 20 that is fit within the vehicle body 10. The rear seat 20 may be any desired shape, size, or configuration desired for a rear seat 20 of a vehicle. The rear seat 20 includes a lower cushion seat 30 and a seatback 40. Each of the cushion seat 30 and seatback 40 are provided with a covering 22 fit over a cushion 44. The covering 22 may be any useful seat covering or any appropriate known material such as cloth, vinyl, leather, and the like.

The seatback 40 includes a frame 42 and pivots about a pivot axis 46 to allow the seatback 40 to at least fold to a stowed position, such as fold forward (illustrated as Ff in the Figures) or fold rearward (illustrated as Fr in the Figures) relative to the cushion seat 30. In some embodiments, the seatback 40 may fold both rearward and forward depending on the desires of the occupant. Although not illustrated, in some embodiments, the pivot axis for the fold features may be different from the pivot axis for the recline mechanism. Having different pivot axes may be desirable as the pivot axis for the fold mechanism may not be suitably located to comfortably adjust the angle of the seatback for a vehicle occupant situated in the seat 20.

In the illustrated embodiment, to maintain the seatback 40 in an upright position (illustrated as U in the Figures), in particular while a passenger is seated in the seat, an anchor member 12 attached to the vehicle body 10 interfaces with a latch mechanism 60 on the seat frame 42 to hold the seatback 40 in an upright position when it is not desired to be folded forward or folded rearward. As further illustrated in the figures, the seatback 40 also interfaces with a recline mechanism 80 that permits the seatback 40 to be adjusted to a desired reclined angle (illustrated as R in the Figures) without being stowed or folded forward or being folded rearwards. This allows a passenger of the vehicle to adjust the angle of the seatback 40 for comfort and convenience.

The anchor member 12 may be moveable in some embodiments to allow the seat to fold both forward and rearward. More specifically, as illustrated in the exemplary figures, the latch mechanism 60 would only allow a fold forward movement, unless the anchor member 12 is capable of being moved to allow the fold rearward movement. The anchor member 12 may be retracted in some embodiments, folded in others or use any other mechanism that allows the anchor member 12 to securely anchor the seat 20, but move when the seat 20 is desired to fold to certain positions. Of course, the latch mechanism 60 may differ from the illustrated embodiments and allow the anchor member 12 to pass through the complete latch mechanism. For example, the anchor member 12 may move in and out of engagement with the latch mechanism, using ramped portions (not illustrated) on the latch mechanism. If is anticipated if the anchor member 12 needs to be moved for certain stowed positions, the same release mechanism used for the latch mechanism 60, in particular the retention mechanism would be used to move the anchor member. Of course, the anchor member may be individually moved by a separate release mechanism.

With reference to FIGS. 2-5, which the present invention is illustrated in an exemplary car, where the vehicle body 10 receives the rear seat 20 which includes the lower cushion seat 30 upon a base or vehicle frame 14 and the seatback 40 aligned approximately with the vehicle door frame 16. The position of the rear seat 20 and in particular the seatback 40 may also vary depending on the type of vehicle in which the rear seat 20 is situated. The lower cushion seat 30 may be configured to fold forward, in some embodiments, although it is not illustrated as requiring to be folded forward in the exemplary figures to fold the seatback 40 to a fold forward position. The anchor member 12 is generally attached to the vehicle body 10 during the assembly process such as during assembly to the body in white in an area proximate to the door frame 16. Of course, other configurations and locations for the anchor member 12 may be used depending upon the desired application as well as the shape and configuration of the vehicle body 10. Of course, the anchor member 12 may be located in other positions or coupled to other support members as described in more detail below. Although the door frame 16 is that of an illustrated exemplary car, the door frame 16 may vary substantially for other types of vehicles such as vans, SUVs, and the like. For example, in an SUV the anchor member 12 may be attached to any structural component of the vehicle body 10 in a location remote from the door frame 16. In some vehicles where limited availability exists to attach the anchor member 12 to the door frame 16, the seat 10 may internally include all the necessary components.

Figure 3:
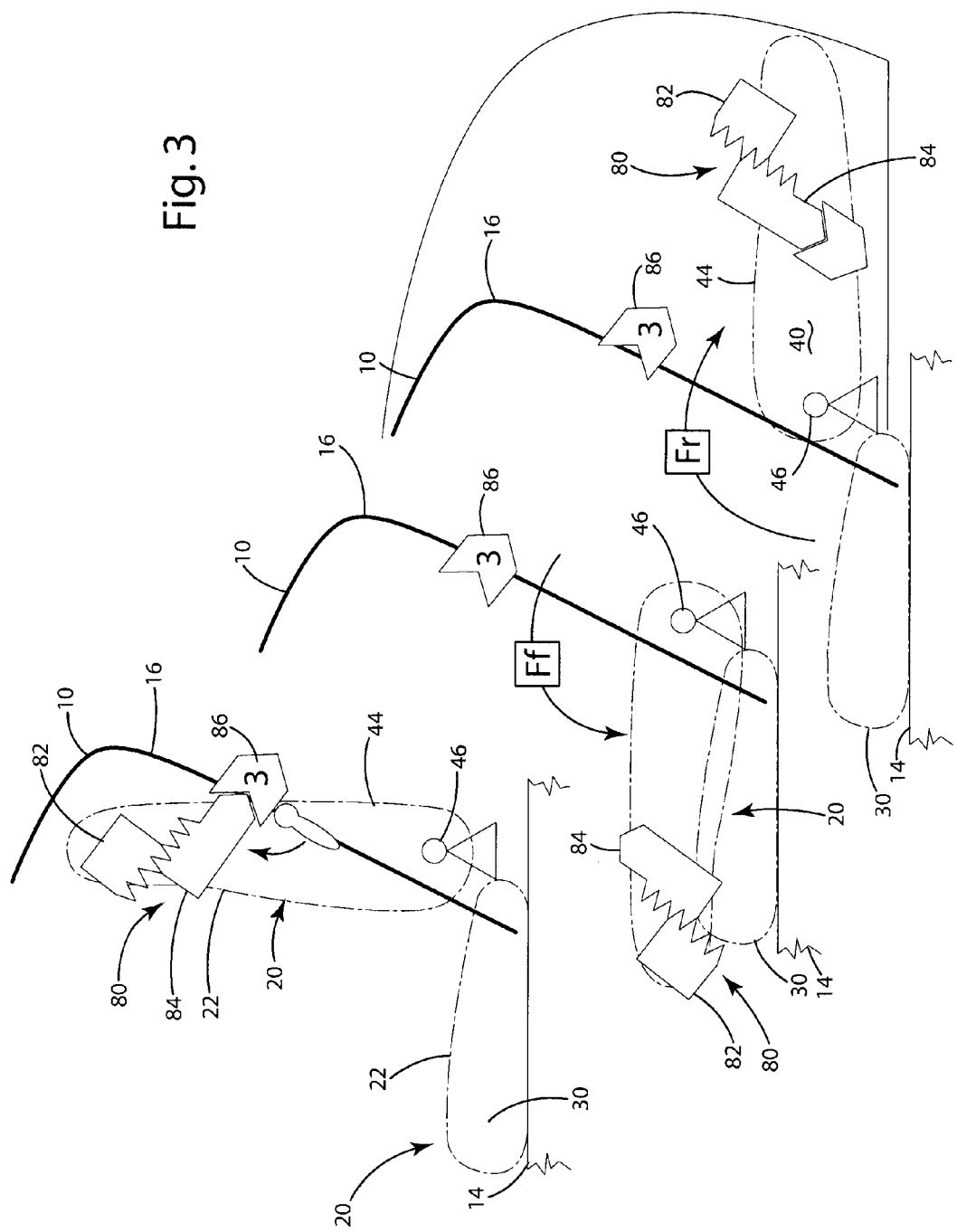
FIG. 3 is a schematic diagram showing the seat in an upright position and different stowed positions, such as an exemplary fold forward position, and fold rearward position.
Figure 5:
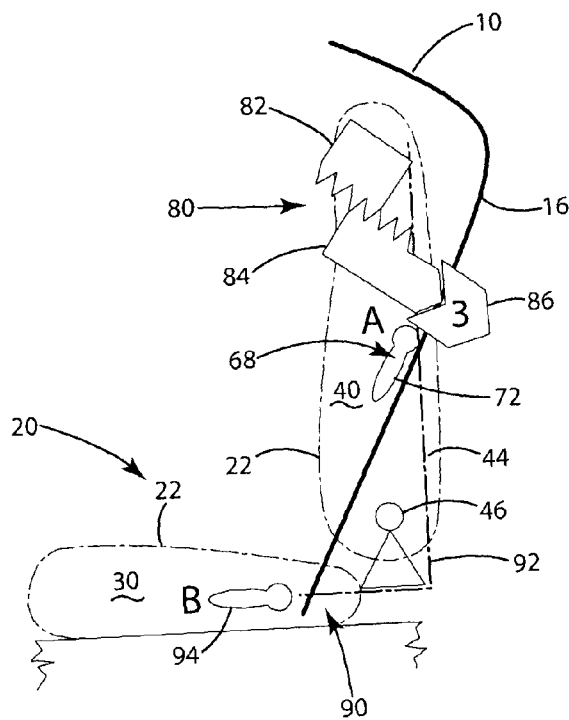
FIG. 5 is a schematic view of the seat in an upright position.

The seatback 40 includes the exemplary seat frame 42 illustrated in FIG. 5, which may have any desired size, shape, or configuration depending upon the type or shape of the seat or the type of vehicle in which the seatback 40 is placed. The frame 42 is generally surrounded by the cushion 44 which is covered by the covering 22. The covering 22 generally forms the seating surface. The frame 42 is configured to pivot around at least one pivot axis, such as the illustrated pivot axis 46. In the illustrated embodiment, the frame 42 includes pivot members 48 through which a bar, pin, bolt, such as a shoulder bolt, or the like (not illustrated) is inserted. In the illustrated embodiment, the seatback 40 is configured to pivot about the pivot axis 46 when the seatback 40 is moved from the upright position to a fold forward position as illustrated in FIG. 3 and also pivot about the pivot axis 46 when the seat is moved from an upright position to the fold rearward position as further illustrated in FIG. 3.

Figure 4:
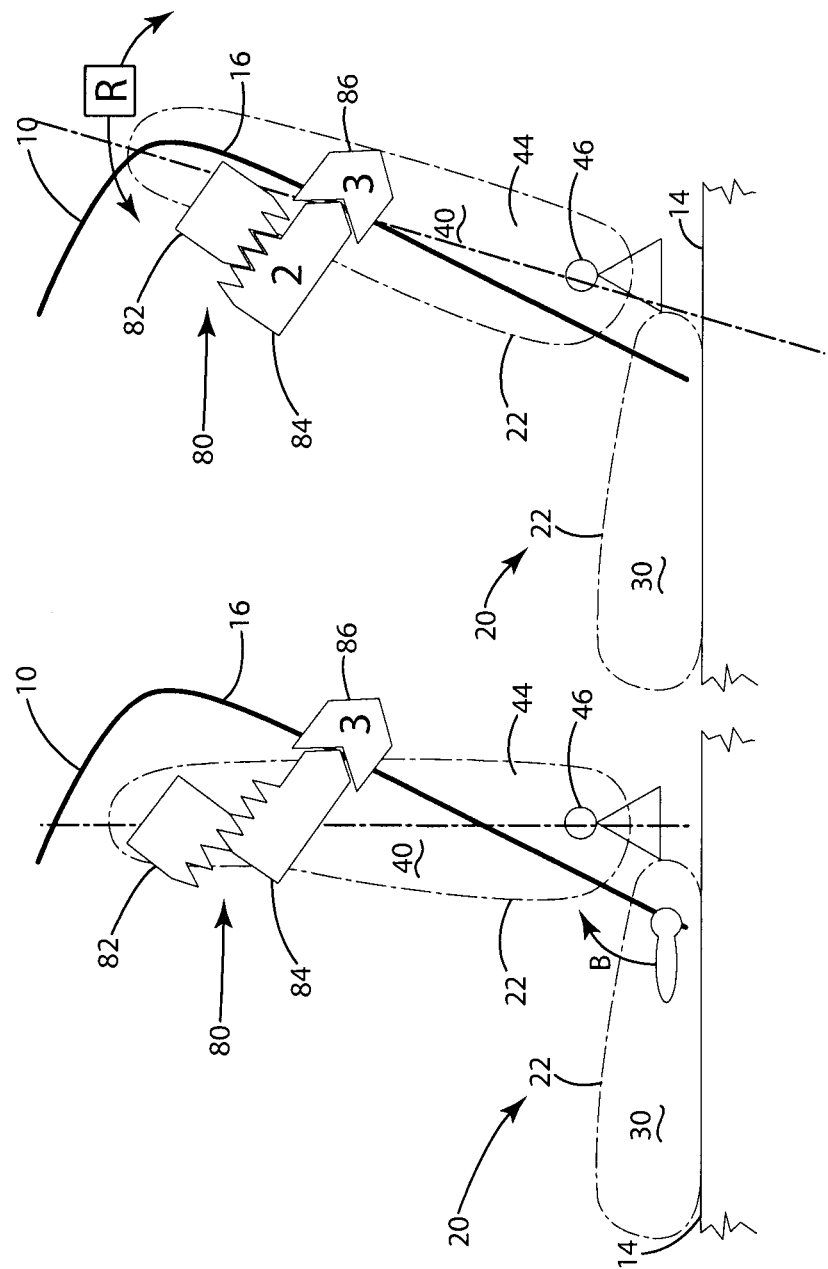
FIG. 4 is a schematic diagram showing exemplary reclined and upright positions.

As illustrated in FIG. 4, the pivot axis 46 may also allow the seatback 40 to pivot between an upright position and a reclined position. More specifically, as the seat is moved from the upright position to the reclined position as illustrated in FIG. 4, the seatback 40 pivots about the pivot axis 46. The actual location of the pivot axis 46 may vary depending on the vehicle and type of seat. In the exemplary illustrated embodiment, the seat frame 42 uses the same pivot axis 46 for both the folding functions as well as the recline functions; however, in some embodiments, the pivot axis 46 may differ, such as to provide a more comfortable pivot axis for the passenger using the recline mechanism. The pivot axis 46 may also vary such as when the pivot axis of the fold function is incompatible with the pivot axis of the recline mechanism. For example, the seatback 40 may include more than one pivot axis such as using a first pivot axis when moving the seatback 40 between an upright, a fold forward, and fold rearward position and using a second pivot axis when moving between an upright and reclined position. The pivot axis 46 may be attached either directly to the vehicle floor or body 10, or may be attached indirectly to the vehicle such as being attached to a lower frame of the seat (not illustrated).

The latch and recline mechanisms 60, 80 are high-lock systems and not low-systems and more specifically are located remote from the pivot axis 46. More specifically the mechanisms 60, 80 are not centered about or located about the pivot axis as are low-lock systems. As illustrated in the figures, the latch and recline mechanisms 60, 80 are located between the pivot axis and top of the seat frame, such that the latch and recline mechanisms 60, 80 are located remote from the pivot axis. This allows for a balance of load and force versus amount of recline. The amount of recline increases as the recline mechanism 80 is positioned closer to the pivot axis, without any change in the recline mechanism. Of course, the closer the recline mechanism is to the pivot axis, the more load or force the recline and latch mechanism experiences.

Figure 6:
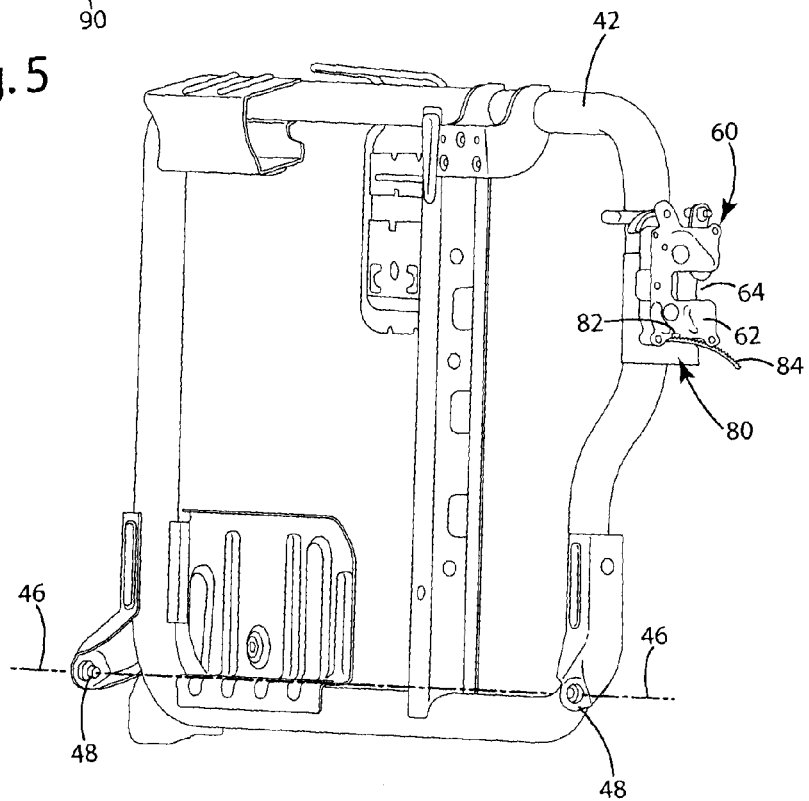
FIG. 6 is a perspective view of an exemplary seatback frame used in the seat and further illustrating the latch mechanism, recline mechanism, and pivot axis.

As illustrated in FIG. 6, attached to the frame 42 is the latch mechanism 60. The latch mechanism 60 generally includes a latch 62 which has an opening 64 into which the anchor member 12 is retained when the seatback 40 is in the upright position. The latch 62 couples the seat frame 42 to the anchor member 12 to prevent the seatback 40 from moving from the upright position to the fold forward position or fold rearward position. The latch 62 uses a retention mechanism 68 to lock the anchor member 12 within the opening 64. As illustrated schematically in FIG. 5, the latch mechanism 60 may be attached to a release mechanism or a pivot handle 72 which is used to engage and disengage the retention mechanism 68. Although not illustrated, the pivot handle 72 may be connected to the retention mechanism 68 by a cable. The latch mechanism 60 is illustrated as being located remotely, such as approximately half way between the pivot axis 46 and top of the seat frame 42; however, the latch mechanism 60 may vary in proximity to the pivot axis 46, so long as it is remote to the pivot axis 46 as illustrated in FIG. 3, and not aligned about the pivot axis.

Figure 7:
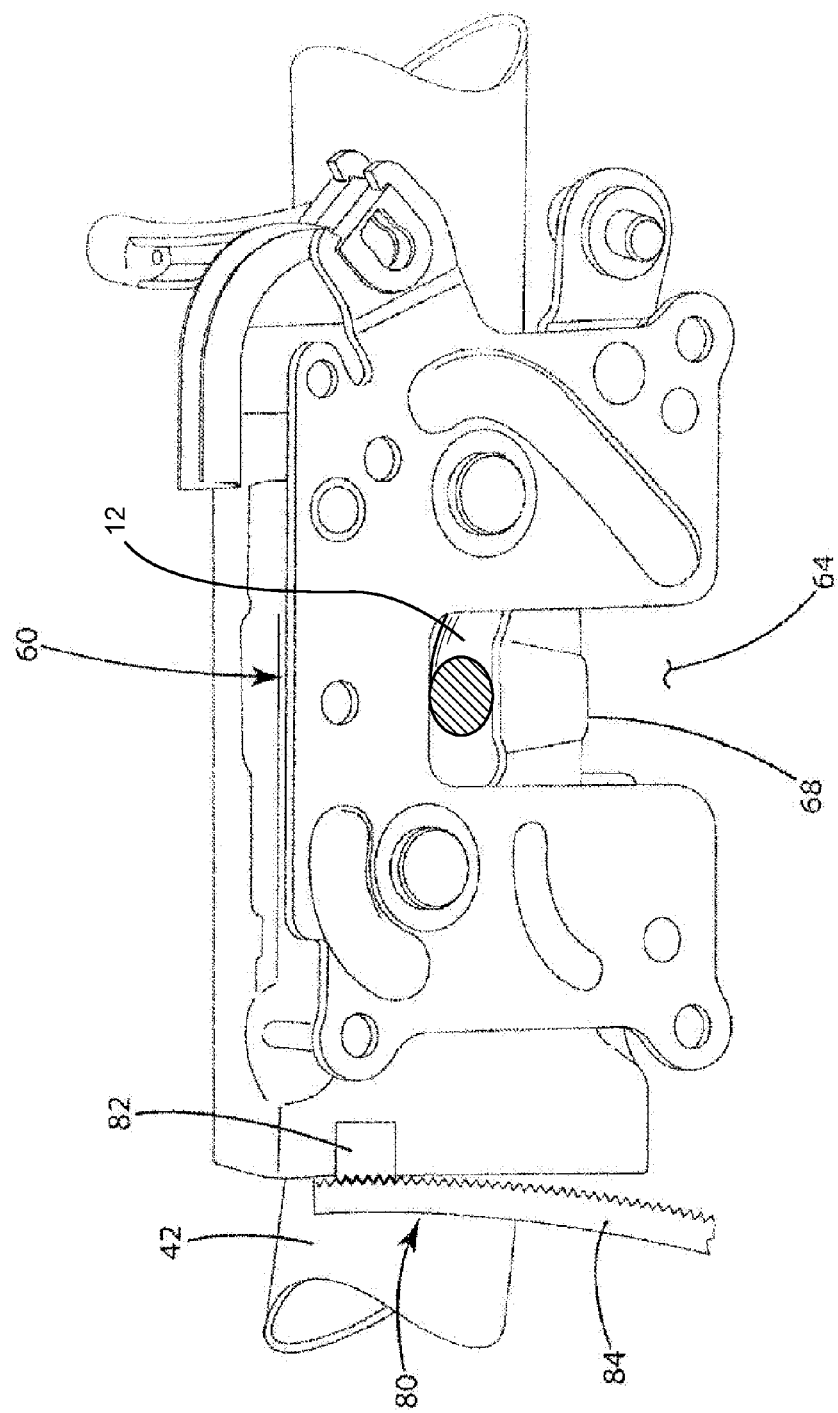
FIG. 7 is an enlarged partial side view of the latch mechanism and recline mechanism.
Figure 8:
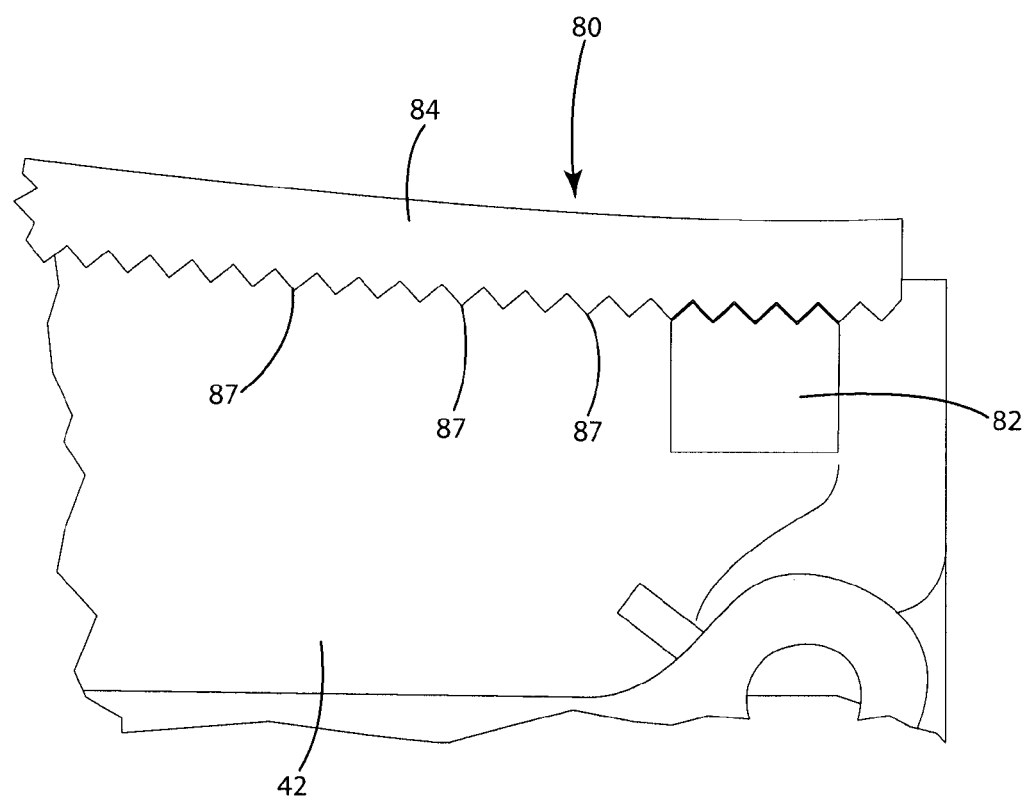
FIG. 8 is an enlarged partial view of the recline mechanism.

The seatback 40 also includes the recline mechanism 80 coupled to the frame 42 or to the latch mechanism 60. The recline mechanism 80 creates an interface between the frame 42 and the latch mechanism 60 to allow the frame 42 to move relative to the latch mechanism 60 and the anchor member 12, about the pivot axis 46. The recline mechanism 80 typically includes a first engagement or recline mechanism 82, such as a plate with teeth or gears, commonly referred to as a sector in the industry, and a second engagement or recline mechanism 84 such as an elongated member with teeth or gears configured to engage the teeth or gears on the first mechanism 82 and is commonly referred to as a rack in the industry. The first and second mechanisms 82 and 84 are configured to engage and disengage upon operation of release mechanism 90, typically including a cable 92 and a handle 94, illustrated schematically, in FIGS. 4 and 5. The recline mechanism 80 may be formed from items other than a sector engaging a rack. In the embodiment illustrated in FIG. 7, the sector 82 is attached to the latch mechanism 60 and the rack 84 is attached to the frame 42. The recline mechanism 80 is not located about the pivot axis (not illustrated), but instead remote from the pivot axis. The recline mechanism is 80 illustrated schematically in FIGS. 3-5 and is expected to have a greater range of movement than illustrated, more specifically, at least one of the first and second mechanisms 82 and 84 would include a many more teeth, such as illustrated in FIGS. 7 and 8. The range of movement of the recline mechanism 80, and the size and configuration of the first and second mechanisms 82, 84 may vary depending on the desired amount of recline and distance between stops. The amount of recline may also be limited by the amount of cushion space available or width of the seat. More specifically, with the recline mechanism located within the seatback 40, the recline mechanism 80 is hidden within the seatback 40 and thereby limited in amount of recline proportional to the width of the seatback 40. Of course, certain contours of bulges may be added to the seat to enclose a larger recline mechanism. However, in other embodiments, the recline is not limited by the amount of space in the seatback, such as the thickness of the cushion.

The recline mechanism 80 may further include a stop 86 to limit movement of the seat or index positions 87 between the full upright position and the full recline position to allow multiple positions of adjustment. The stop 86 is configured to prevent the recline mechanism 80 from allowing the seatback 40 to extend to forward or rearward. For example, as illustrated in FIG. 4, in the first position the seatback 40 is in a completely upright position. As further illustrated in FIG. 4, in the reclined or second position, the seatback is moved to a fully reclined position. To prevent movement beyond the fully reclined position, the seatback 40 is illustrated as having a stop 86, attached to a stationary object, such as the vehicle body 10 to limit the amount of recline or movement beyond the upright position. Although the figures do not illustrate a forward stop, one may be easily added to limit movement of the seat beyond the desired upright position.

In some embodiments, the handles 72 and 94 may be combined into a single handle (not illustrated) which may control the latch mechanism 60 as well as the recline mechanism 80. In some embodiments, even with the vehicle seatback 40 folded in the fold forward position or fold rearward position, the recline mechanism 80 may be activated to allow angling of the seatback 40 relative to the cushion seat 30 or surface of the cargo area. For example, if it is desirable to add a load to the vehicle which needs additional support or additional space, the additional support or space may be provided through movement of the seatback 40 via the recline mechanism 80 when the seatback 40 is in the fold forward or fold rearward position.

The present invention allows a passenger of a vehicle to easily move a seatback 40 between an upright and reclined position with multiple positions therebetween. This allows maximization of the comfort for the vehicle passenger while in the vehicle. The recline mechanism 80 does not interfere with the latch mechanism 60 which further allows, when there is no passenger in the rear seat 20 of the vehicle, for the seatback 40 to be folded from the upright position to a stowed position, such as a fold forward position or to a fold rearward position.

The present invention may also be used in other applications including some vehicles where the invention would be useful in additional areas. For example, in some SUVs, minivans, cross-over vehicles and other vehicles having more than one row of seating behind the front seat, the invention may be used with all of these seats. In some embodiments, although not illustrated, the latch mechanism 60 and recline mechanism 80 may not be coupled to the frame 16, but instead to a double seat frame (not illustrated). For example, if the present invention was used in connection with a vehicle other than a car, such as a bus or train seat, it could be used without reference to the door frame and without being a rear seat of a vehicle.

The foregoing discussion discloses and describes an exemplary embodiment of the present invention. One skilled in the art will readily recognize from such discussion, and from the accompanying drawings that various changes, modifications and variations can be made therein without departing from the true spirit and fair scope of the invention.

What is claimed is:

1. A seat assembly comprising:
    a seatback having a frame that is movable about a pivot axis;
    said seatback including a latch mechanism spaced from said pivot axis and having an opening for receiving an anchor member and a retention mechanism for retaining the anchor member within said opening to releasably lock said latch mechanism into engagement with the anchor member, said latch mechanism movably mounted to said frame; and
    said seatback further including a recline mechanism spaced from said pivot axis and operably coupling said latch mechanism with said frame and allowing movement of said frame relative to said latch mechanism when said latch mechanism is locked into engagement with the anchor member.

2. The seat assembly of claim 1 wherein said recline mechanism includes a sector in engagement with one of said latch mechanism and said frame and a rack in engagement with the other of said latch mechanism and said frame.

3. The seat assembly of claim 1 further including a latch release mechanism operably coupled with said retention mechanism for releasing the anchor member.

4. The seat assembly of claim 1 wherein said recline mechanism allows said seat frame to pivot about a pivot axis.

5. The seat assembly of claim 4 wherein said recline mechanism further includes at least one stop for relative movement of said frame relative to said latch mechanism.

6. A rear seat assembly for a vehicle having a body and an anchor member attached to the body, said rear seat assembly comprising:
    a seatback having a frame, said frame being pivotable about a pivot axis between a folded position and a seating position;
    said seatback including a latch mechanism spaced from said pivot axis and having an opening for receiving the anchor member when said seatback is in said seating position, said latch mechanism movably mounted to said frame;
    a retention mechanism at least partially located within said opening of said latch mechanism for releasably engaging the anchor member when said seatback is in said seating position; and
    said seatback further including a recline mechanism spaced from said pivot axis and operably coupling said latch mechanism with said frame and allowing movement of said frame relative to said latch mechanism when said retention mechanism is locked in engagement with the anchor member.

7. The rear seat assembly of claim 6 wherein said recline mechanism includes a sector in engagement with one of said latch mechanism and said frame and a rack in engagement with the other of said latch mechanism and said frame.

\* \* \* \* \*